United States Patent
Acevedo

[11] Patent Number: 5,818,361
[45] Date of Patent: Oct. 6, 1998

[54] DISPLAY KEYBOARD

[76] Inventor: Elkin Acevedo, P.O. Box 42412, Pittsburgh, Pa. 15203-0412

[21] Appl. No.: 744,606

[22] Filed: Nov. 7, 1996

[51] Int. Cl.$^6$ ..................................................... H03K 17/94
[52] U.S. Cl. .............................. 341/23; 341/22; 345/170
[58] Field of Search ................................ 341/20, 22, 23; 400/493, 485, 486; 200/308, 310, 312, 512; 345/170, 173

[56] References Cited

U.S. PATENT DOCUMENTS

| | | | |
|---|---|---|---|
| 4,527,250 | 7/1985 | Galdun | 341/23 |
| 4,823,311 | 4/1989 | Hunter | 341/23 |
| 4,853,888 | 8/1989 | Cata | 345/172 |
| 5,144,303 | 9/1992 | Purcell | 341/23 |
| 5,166,683 | 11/1992 | McKay | 341/23 |
| 5,181,029 | 1/1993 | Kim . | |
| 5,382,777 | 1/1995 | Yuhara | 235/379 |
| 5,491,495 | 2/1996 | Ward | 345/173 |
| 5,510,809 | 4/1996 | Sakai | 345/140 |
| 5,515,045 | 5/1996 | Tak | 341/23 |
| 5,594,471 | 1/1997 | Deeran | 345/173 |
| 5,617,343 | 4/1997 | Danielson | 395/200.75 |
| 5,650,605 | 7/1997 | Morioka | 235/379 |

Primary Examiner—Michael Horabik
Assistant Examiner—Albert K. Wong

[57] ABSTRACT

A display keyboard including a conventional keyboard having an upper edge, lower edge, and pair of side edges. A plurality of display keys are situated on the keyboard. Each display key has a liquid crystal display, light emitting diode display, or any future state of the art display invention situated thereon for depicting alphanumeric characters and indicia. Finally, for controlling the operation of the present invention, a conventional computer is connected to the keyboard and adapted to depict via the display keys characters and indicia relevant to the function of the key during a current software application. To prevent confusion and eliminate clutter, the display keys that are not relevant to the software are rendered blank. In essence, all of the keys of the display keyboard have display capabilities, but it is at the discretion of the manufacture which keys should be able to display.

1 Claim, 4 Drawing Sheets

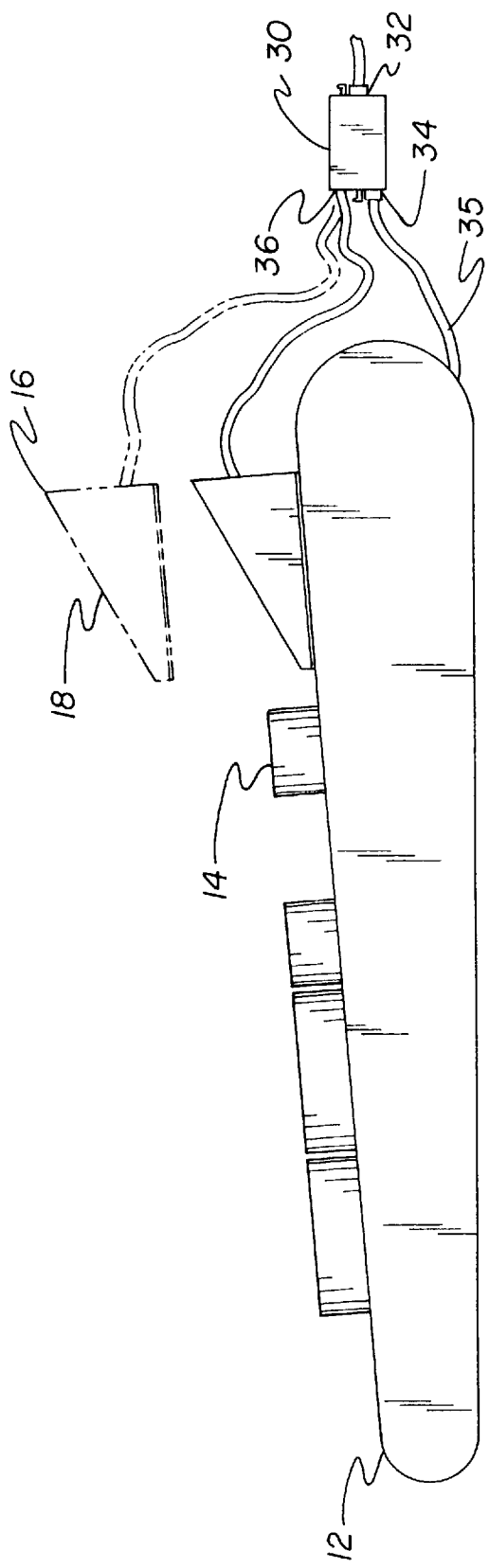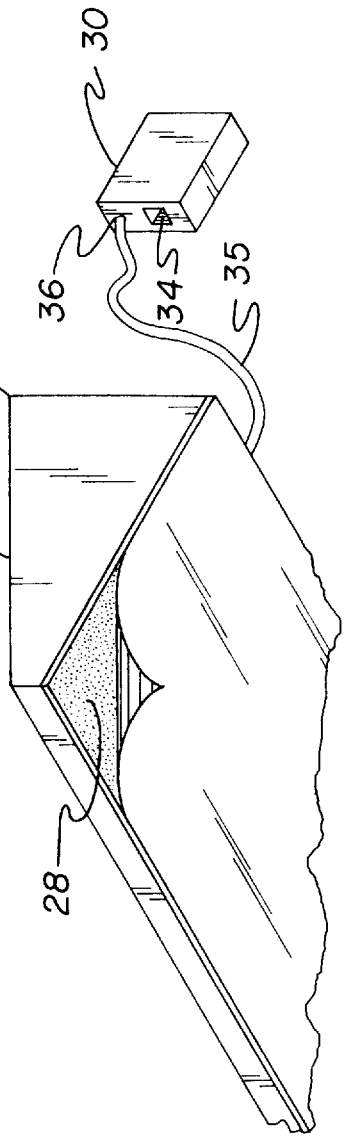

DISPLAY KEYBOARD

BACKGROUND OF THE INVENTION

1. Field of the Invention

The present invention relates to a display keyboard and more particularly pertains to displaying the alphanumeric character, task, and indicia associated with a key of a keyboard for a plurality of software applications.

2. Description of the Prior Art

The use of keyboard templates is known in the prior art. More specifically, keyboard templates heretofore devised and utilized for the purpose of depicting the function of associated keys are known to consist basically of familiar, expected and obvious structural configurations, notwithstanding the myriad of designs encompassed by the crowded prior art which have been developed for the fulfillment of countless objectives and requirements.

By way of example, the prior art discloses in U.S. Pat. No. 5,181,029 to Kim an electronic keyboard template with software application programs responsive to command signals transmitted by designated function keys on a computer keyboard including an LCD display. U.S. Pat. No. 4,853,888 to Lata et al. discloses a programmable multi-function keyboard system in which the key figures and the relationship between key figurations are specified by a data base. U.S. Pat. No. 4,823,311 to Hunter et al. discloses a calculator having a keyboard in which one or more keys have labels created by a display an subject to changing interactively as the user desires. Lastly, U.S. Pat. No. 5,166,683 to McKay; U.S. Pat. No. 5,144,303 to Purcell; and U.S. Pat. No. 4,527,250 to Galdun et al. are provided as being of general interest.

In this respect, the display keyboard according to the present invention substantially departs from the conventional concepts and designs of the prior art, and in so doing provides an apparatus primarily developed for the purpose of displaying the alphanumeric character, task, and indicia associated with a key of a keyboard for a plurality of software applications.

Therefore, it can be appreciated that there exists a continuing need for a new and improved display keyboard which can be used for displaying the alphanumeric character, task, and indicia associated with a key of a keyboard for a plurality of software applications. In this regard, the present invention substantially fulfills this need.

SUMMARY OF THE INVENTION

In view of the foregoing disadvantages inherent in the known types of keyboard templates now present in the prior art, the present invention provides an improved display keyboard. As such, the general purpose of the present invention, which will be described subsequently in greater detail, is to provide a new and improved display keyboard which has all the advantages of the prior art and none of the disadvantages.

To attain this, the present invention essentially comprises a conventional keyboard having an upper edge, lower edge, and pair of side edges. Also included is a plurality of function keys comprising of a standard CTRL key, SHIFT key, CAPS LOCK key, ENTER key, and ALT key situated on the keyboard with conventional indicia situated thereon. A plurality of display keys are also situated on the keyboard. Each display key has a liquid crystal display, light emitting diode display, or any future state of the art display invention situated thereon for depicting alphanumeric characters and indicia. Finally, for controlling the operation of the present invention, a conventional computer is connected to the keyboard and adapted to depict via the display keys characters and indicia relevant to the function of the key during a current software application. To prevent confusion and eliminate clutter, the display keys that are not relevant to the software are rendered blank. The computer is further adapted to display via the display keys characters the specific executable task associated with the combination of depressing one of the ALT, CTRL, or SHIFT keys simultaneously with one of the display keys.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved display keyboard which has all the advantages of the prior art keyboard templates and none of the disadvantages.

It is another object of the present invention to provide a new and improved display keyboard which may be easily and efficiently manufactured and marketed.

It is a further object of the present invention to provide a new and improved display keyboard which is of a durable and reliable construction.

An even further object of the present invention is to provide a new and improved display keyboard which is susceptible of a low cost of manufacture with regard to both materials and labor, and which accordingly is then susceptible of low prices of sale to the consuming public, thereby making such display keyboard economically available to the buying public.

Still yet another object of the present invention is to provide a new and improved display keyboard which provides in the apparatuses and methods of the prior art some of the advantages thereof, while simultaneously overcoming some of the disadvantages normally associated therewith.

Still another object of the present invention is to display the alphanumeric character, task, and indicia associated with a key of a keyboard for a plurality of software applications.

Lastly, it is an object of the present invention to provide a new and improved display keyboard including a conventional keyboard having an upper edge, lower edge, and pair of side edges. A plurality of display keys are situated on the keyboard. Each display key has a liquid crystal display, light emitting diode display, or any future state of the art display invention situated thereon for depicting alphanumeric characters and indicia. Finally, for controlling the operation of the present invention, a conventional computer is connected to the keyboard and adapted to depict via the display keys characters and indicia relevant to the function of the key during a current software application. To prevent confusion and eliminate clutter, the display keys that are not relevant to the software are rendered blank.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a side plan view of the alternate embodiment of the present invention.

FIG. 4 is a bottom perspective view of the alternate embodiment of the present invention.

Similar reference characters refer to similar parts throughout the several views of the drawings.

DESCRIPTION OF THE PREFERRED EMBODIMENT

Figure 1:
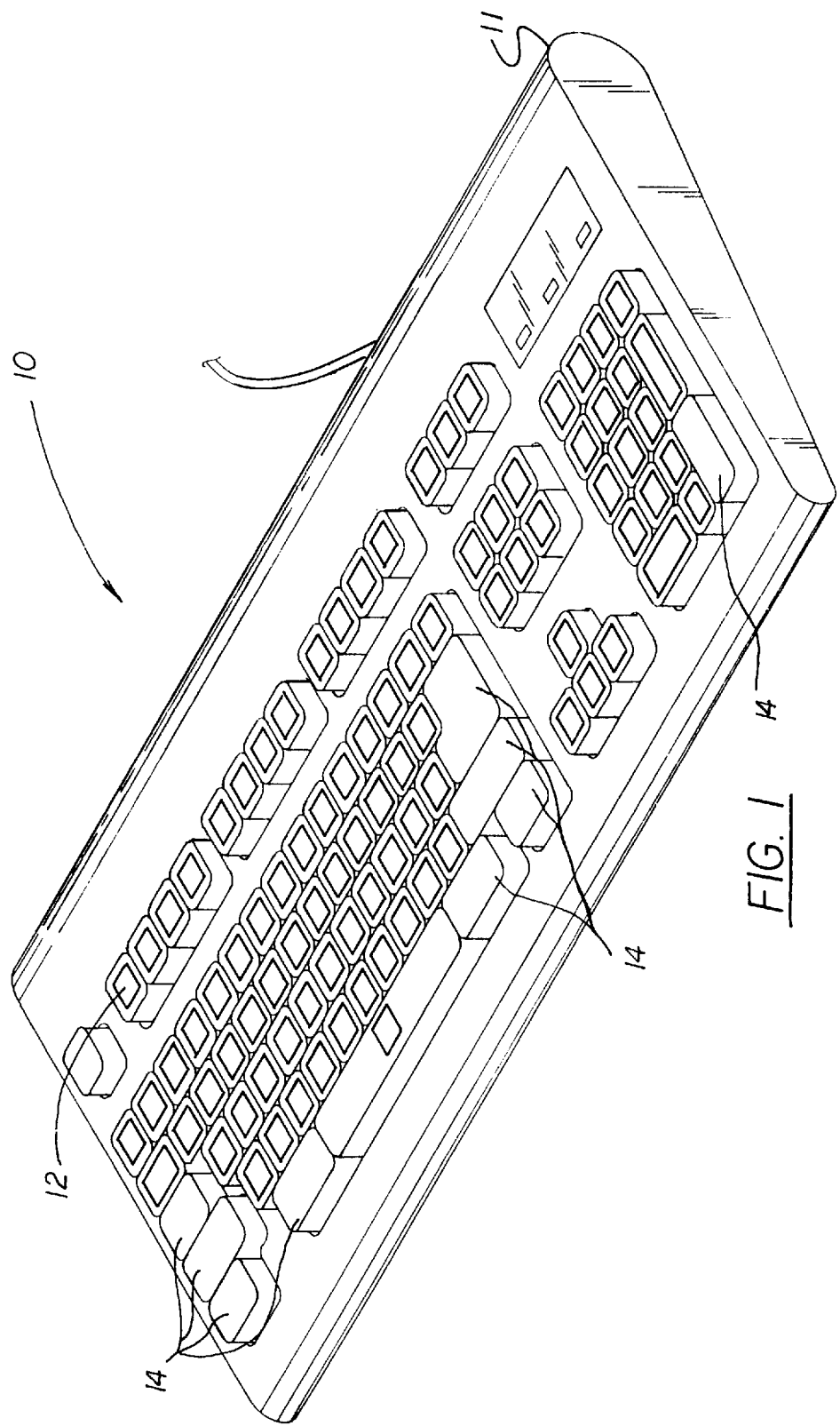
FIG. 1 is a perspective illustration of the preferred embodiment of the display keyboard constructed in accordance with the principles of the present invention.
Figure 2:
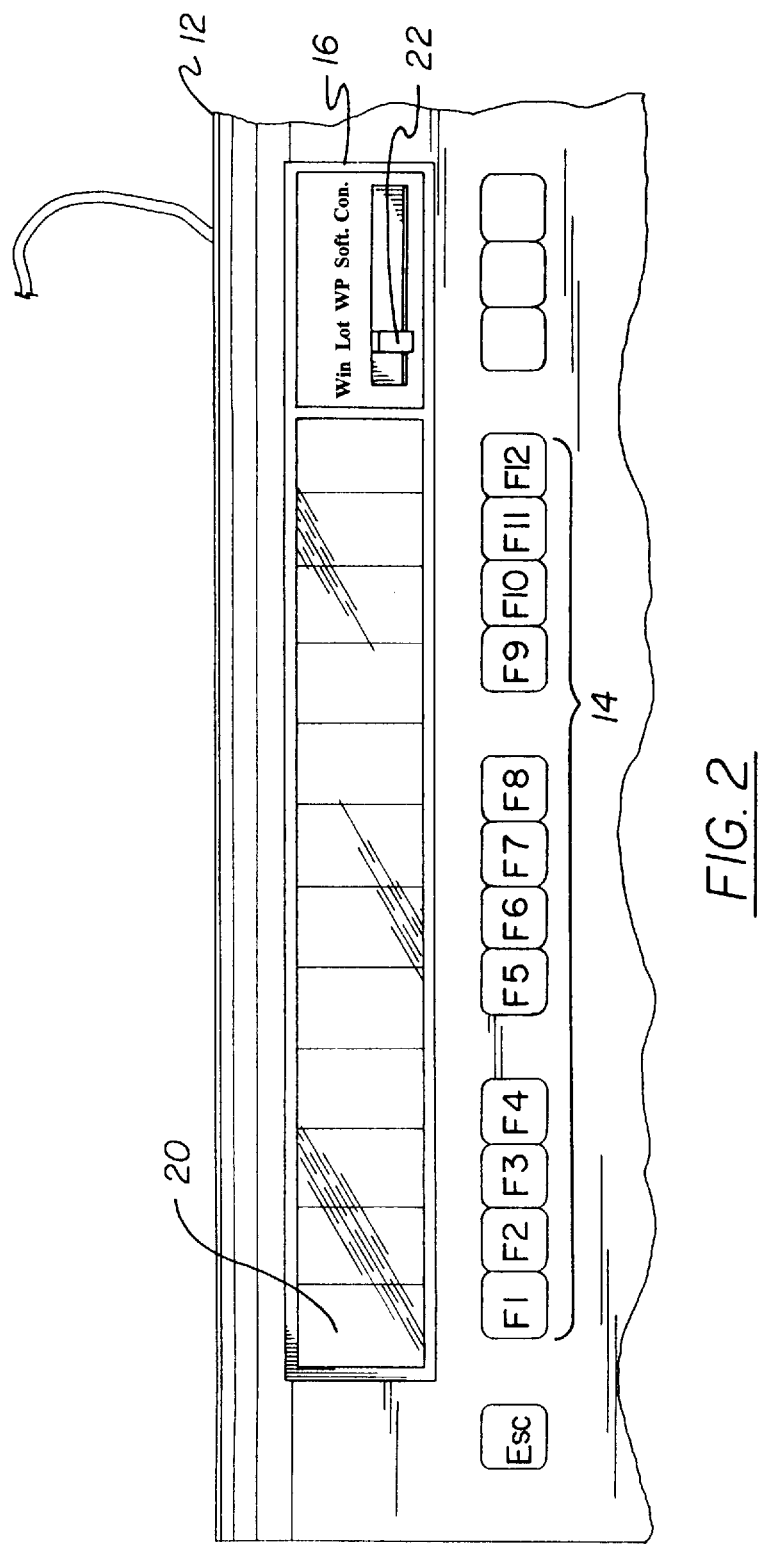
FIG. 2 is a cut-away top plan view of an alternate embodiment of the present invention.
Figure 5:
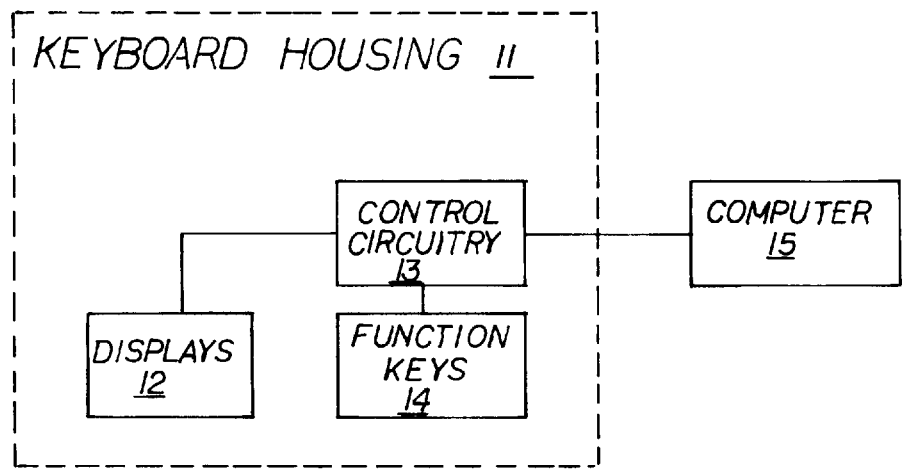
FIG. 5 is a schematic depicting the interconnection of components of the preferred embodiment of the present invention.
Figure 6:
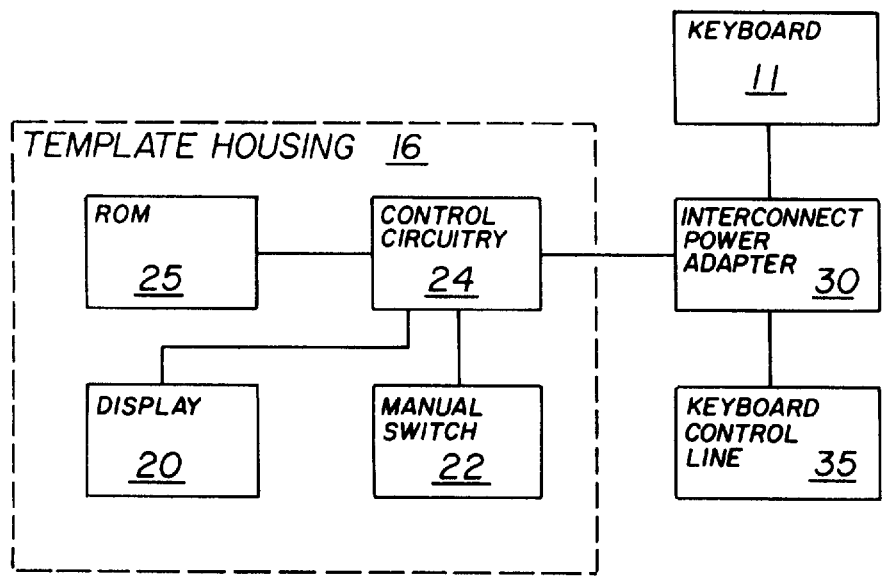
FIG. 6 is a schematic depicting the interconnection of components of the alternate embodiment.

With reference now to the drawings, and in particular to FIG. 1 thereof, a new and improved display keyboard embodying the principles and concepts of the present invention and generally designated by the reference numeral 10 will be described.

The present invention, the new and improved display keyboard, is comprised of a plurality of components. Such components in their broadest context include a keyboard, a plurality of function keys, a plurality of display keys, and a computer. Such components are individually configured and correlated with respect to each other so as to attain the desired objective.

More specifically, it will be noted that the system 10 of the present invention includes a conventional keyboard 12 having an upper edge, lower edge, and pair of side edges.

Also included is a plurality of function keys 14 comprising of a standard CTRL key, SHIFT key, CAPS LOCK key, ENTER key, and ALT key situated on the keyboard with conventional indicia imprinted thereon.

A plurality of display keys 12 which constitute the remaining keys of the keyboard are also situated on the keyboard. Each display key has a liquid crystal display, light emitting diode display, or any future state of the art display invention situated thereon for depicting alphanumeric characters, symbols, special characters, pictures, icons abbreviations, short explanations, and indicia. Such versatility is especially beneficial in games wherein pictures of fire buttons, ray guns, laser guns, cannons, throttles, steering wheel-like controls, pedals, and brakes may be depicted to represent a function of the present game. The display keys are also capable of depicting a foreign alphabet such as Greek, Russian, Arabic, Chinese, and Japanese along with any accompanying symbols such as tildes. The display keys are adapted to change color to further differentiate between alphanumeric characters (i.e., numbers and letters) and keys that have functions that differ such as in the application of games. The color of all the display keys may also be selected as a matter of personal preference. Alternatively, each display key may comprise of a light emitting diode display. Such display keys are easily removed and replaced if required. As an option, each of the display keys may be equipped with a light to allow the utilization thereof in the absence of ambient light.

Finally, for controlling the operation of the present invention, a conventional computer is connected to standard control circuitry 13 of the keyboard and is adapted to depict via the display keys data relevant to the function of the key during a current software application. Display software is utilized to allow the computer to determine which application is currently being employed and further automatically configure the display keys accordingly. In standard operation and as a default mode, the display software allows the display keys to depict a standard alphanumeric configuration such as an IBM or APPLE/MACINTOSH or any other type of keyboard. To prevent confusion and eliminate clutter, the display keys that are not relevant to the software application currently employed are rendered blank by the display software. The computer is further adapted to display via the display keys data relevant to the specific executable task associated with the combination of depressing one of the ALT, CTRL, or SHIFT keys simultaneously with one of the display keys. The specific task associated with the combination of keys is displayed upon the depression of a function key so as to allow browsing. The display of a specific executable task associated with a combination of keys is not limited to the function keys and may include a combination of solely display keys or two or more function keys. As an option, certain software applications may be allowed to blink or light certain keys thus prompting the depression thereof by a user. It should be noted that the present invention may be employed on typewriters, machinery, and the like.

As shown in FIGS. 2–4 & 6, an alternate embodiment comprising a template housing 16 is positioned between the upper edge of the keyboard and a top row of keys. The housing comprises an upper edge, a lower edge, and a pair of side edges with a top surface coupled thereto. The top surface 18 is angled downwardly from the upper edge to the lower edge thereof for allowing the convenient viewing thereof. A plurality of liquid crystal displays, light emitting diode displays, or any future state of the art display inventions 20 are situated on the angled top surface of the housing. Each display is positioned adjacent to an associated key. A manually operated switch 22 is situated on the top surface of the housing adjacent to the displays. The switch is adapted to select a plurality of modes each of which represent one of a plurality of software applications such as Lotus, WordPerfect, Word, and software controlled. It should be noted that the alternate embodiment may be governed by software in lieu of the switch as in the preferred embodiment. The software controlled mode is added to the template switch so that software developers may support the display keyboard template with new future versions of software. Finally, control circuitry 24 is situated within the housing and operatively connected to the switch, display, and read only memory 25. The control circuitry is adapted to read from the ROM and display a plurality of instruction sets or be software controlled by software written by the application software developer. Each instruction set corresponds to one of the plurality of software applications. Selection of such instruction sets is facilitated by the manually operated switch. Each instruction set includes a plurality of instructions which each correspond to the adjacent key and indicate via the display the executable task performed upon the depression thereof. An adhesive 28 lining is situated on a bottom surface of the housing. Further included is an interconnect adapter 30 comprising an output aperture 32 for receiving a conventional keyboard control line 35 connected to a conventional computer. A first input aperture 34 is included for receiving a conventional keyboard control line connected to the keyboard for providing conventional communication therebetween. A second input aperture 36 is also connected to the keyboard control line for allowing communication therebetween. In the alternate embodiment, the specific tasks associated with the ALT, SHIFT, and CTRL keys are all depicted concurrently via the display. When retrofitted, the present invention affords benefits similar to the primary embodiment by employing a unique partial splice adapter in combination with an adhesive lining. It should be noted that the display keyboard template is optional and it is up to the manufacturer whether he wants to include a built-in template with the display keyboard. The display keyboard could still function without any template at all since the top row function keys can replace the template by displaying in conjunction with the SHIFT, CTRL, or ALT keys. The top row function keys can be used for browsing.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by letters patent of the United States is as follows:

1. A new and improved display keyboard comprising, in combination:

a conventional keyboard having an upper edge, a lower edge, and a pair of side edges;

a plurality of function keys including a standard CTRL key, SHIFT key, CAPS LOCK key, ENTER key, and ALT key situated on the keyboard with conventional indicia situated thereon;

a plurality of display keys situated on the keyboard, each display key having a display situated thereon for depicting alphanumeric characters of various languages, symbols, special characters, pictures, icons abbreviations, short explanations and indicia, the display keys capable of changing colors and blinking to differentiate between numbers and letters and further between display keys having different functions associated therewith, wherein each display key is equipped with a light for allowing the utilization of the keyboard in the absence of ambient light; and a computer with associated software connected to the keyboard for depicting, via the display keys, characters and indicia relevant to the function of the key during a current software application, wherein the improvement comprises: the computer controlling the display keys such that those not relevant to the software application are rendered blank and further wherein the computer displays, via the display keys, data relevant to a specific executable task associated with the combination of depressing one of the ALT, CTRL, or SHIFT keys simultaneously with one of the display keys.

* * * * *